Figure 4:
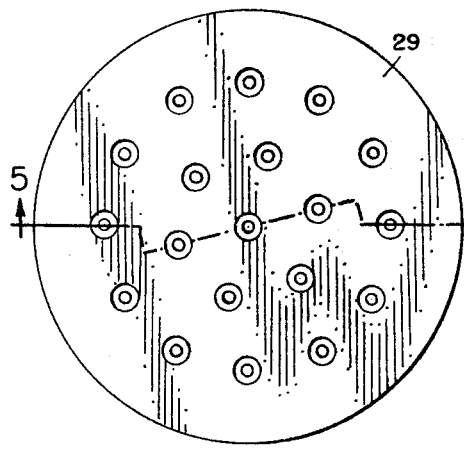

Sept. 27, 1966  J. W. CRAMER  3,274,642
APPARATUS FOR PRILLING AMMONIUM NITRATE
Filed May 12, 1965  2 Sheets-Sheet 1
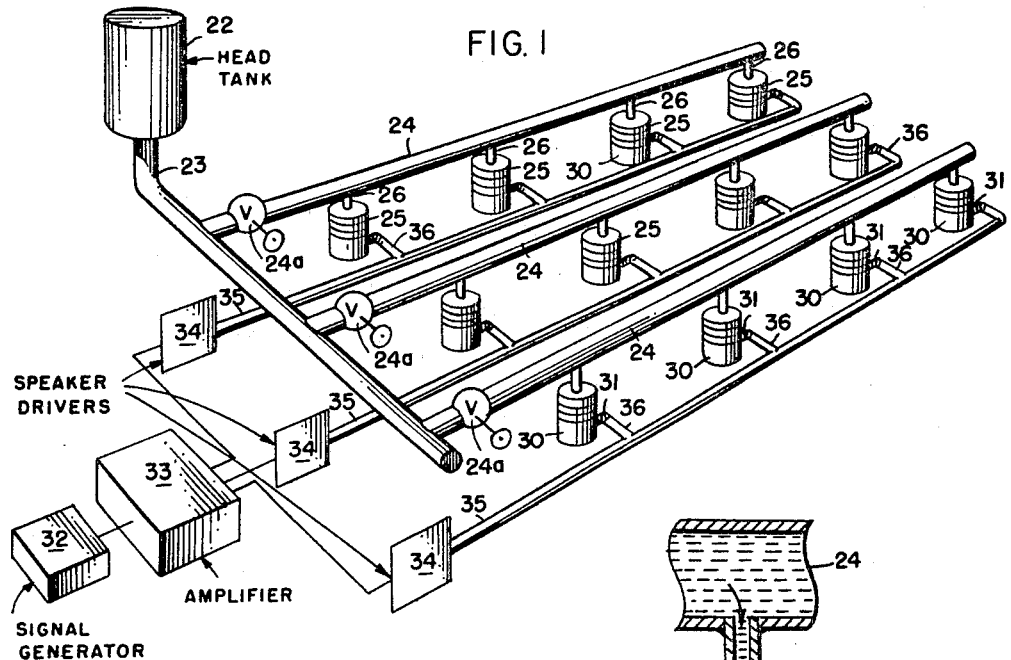
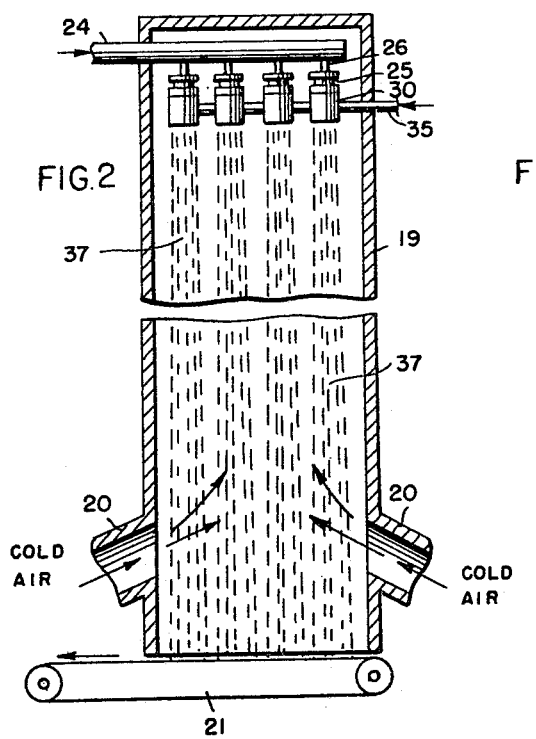
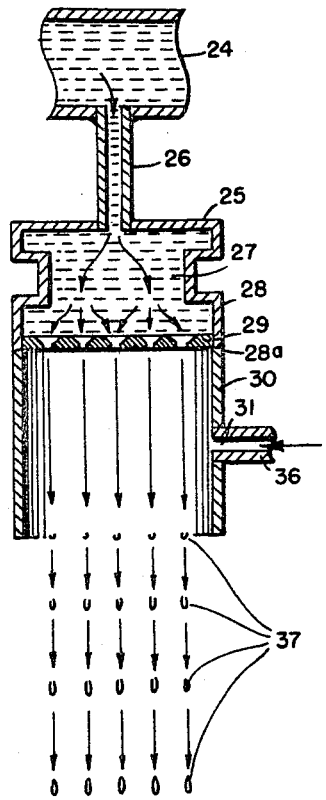
INVENTOR:
JOHN W. CRAMER
BY
Carl C. Batz
ATT'Y Sept. 27, 1966  J. W. CRAMER  3,274,642
APPARATUS FOR PRILLING AMMONIUM NITRATE
Filed May 12, 1965  2 Sheets-Sheet 2

INVENTOR:
JOHN W. CRAMER

BY
Carl C. Batz
ATT'Y

United States Patent Office 3,274,642
Patented Sept. 27, 1966

3,274,642
APPARATUS FOR PRILLING AMMONIUM
NITRATE
John W. Cramer, Crystal City, Mo., assignor to Armour
and Company, Chicago, Ill., a corporation of Delaware
Filed May 12, 1965, Ser. No. 455,272
10 Claims. (Cl. 18—2.7)

This invention relates to the prilling of liquid ammonium nitrate. More specifically, this invention concerns apparatus for forming solid, uniform spherical granules from molten liquid ammonium nitrate and the like.

For many years, various types of apparatus have been known for the production of pebbles of solid material from the molten liquid state by dropping small globules or drops of the hot liquid from a predetermined height. As the liquid falls through space, it cools and becomes solidified before impact. Among others, glass beads, lead shot and ammonium nitrate prills have in the past been formed in this general fashion.

The conventional pebbling or prilling of ammonium nitrate melt is well known in the agricultural chemical industry for the production of granular fertilizer high in nitrogen available for plant food. In the early methods a 96% solution of ammonium nitrate was pumped to the top of a tower through steam-heated lines and fed by gravity to spray-nozzles which dropped the melt from the tower in thin streams that broke into drops and solidified before reaching ground level. In this approach there was very little control over the droplet size and the subsequent prill formation because the droplets were randomly formed from the thin streams as a result of fluid properties and characteristics, stream size and rate of flow, random sonic vibrations, and the actions of aerodynamic forces as the streams fell freely through space to the bottom of the tower.

In other prior practices, sonic and/or mechanical vibrations have been applied to the liquid in a container above the orifice plate by means of an instrument extending into the liquid or by a mechanism which vibrates the container or the plate, with the result that the liquid leaving the orifice plate is partly in motion as the result of such vibrations. Since the vibrations are of a compound nature, the falling stream breaks up into somewhat irregular droplets and a non-uniform product is produced. In such practices, random mechanical and/or sonic disturbances necessarily result and there is always a tendency to form droplets of random size and spacing.

The ability to control prill formation and to produce prills of uniform size is very important in the manufacture of fertilizer because after the prills are formed, the material must be screened, dried, stored in bulk or packaged, transported and used. If the prills are not uniform, losses occur during screening. The fines and the oversized prills must be removed, remelted and reconcentrated for recycling to the top of the tower at great expense and the loss of efficiency in the overall operation. If the size of the prills cannot be controlled and a predominance of optimum sized prills are not produced, the granules cannot be effectively dried. Thorough drying is one of the essential elements necessary to prevent caking of the prilled material after packaging or during storage and transportation. Furthermore, because caking is a great problem, prills of uniform size must be produced for the thorough drying and for the subsequent application of an anti-caking compound and a desensitizer to the surface of the prill to assist in the prevention of caking and explosion during storage, transportation and use.

In view of the above-mentioned art and the many problems relative to the production of uniform solid spherical granules of ammonium nitrate, it is a principal object of this invention to provide an improved apparatus for the controlled production of uniformly prilled ammonium nitrate.

It is a further object of this invention to provide an improved apparatus which can be adjusted to control various sizes of uniform prills of ammonium nitrate.

Another object of this invention is to provide an improved apparatus for uniformly prilling ammonium nitrate which will further minimize the problems of losses, caking, and explosions described above.

I have discovered that by maintaining the liquid body within a confined zone or reservoir in the spray plate cap above the orifice plate in a quiescent state so that the liquid falls freely from the various orifices and through a sound chamber, droplets of uniform size can be obtained by impinging upon such freely dropping streams sonic vibrations within a sound chamber at a pre-selected frequency. Apparently, the sonic vibrations of frequencies within a critical range, when applied to the freely falling streams, cause the streams to break in uniform spacing to produce droplets of uniform size. In other words, by maintaining the pool or body of liquid above the orifice plate in an undisturbed condition while the liquid falls freely from the orifices through a sound chamber, there is a uniform action of the sonic vibrations upon the streams within the sound chamber, to produce droplets which, on cooling, form spherical pebbles of solid material which are alike in size and character.

Figure 7:
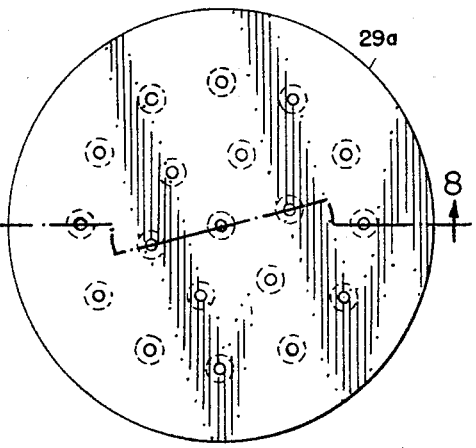
Figure 5:
Figure 8:
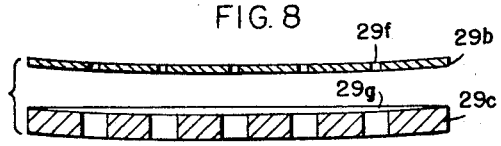
Figure 6:
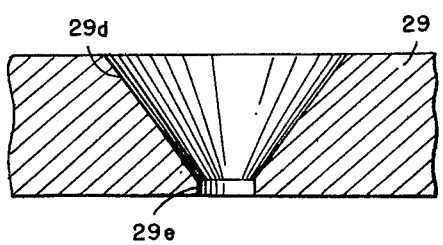
Figure 9:
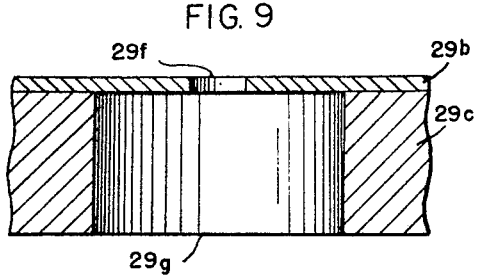

Other objects, advantages and features of my invention will become apparent to those skilled in the art from the following discussion, appended claims and drawings in which:

FIG. 1 is a schematic view of the audio and fluid apparatus systems located at the top of a tower; FIG. 2 is an interrupted plan view in elevation of a prilling tower; FIG. 3 is a cross-sectional view of one orifice plate header assembly; FIG. 4 is a plan view of one embodiment of an orifice plate; FIG. 5 is a cross-sectional view of the orifice plate taken at line 5—5 in FIG. 4; FIG. 6 is an enlarged cross-sectional view of one orifice shown in FIG. 5; FIG. 7 is a plan view of a further embodiment of an orifice plate; FIG. 8 is a cross-sectional view taken at line 8—8 in FIG. 7; and FIG. 9 is an enlarged cross-sectional view of one orifice shown in FIG. 8.

The invention can best be understood by referring to FIG. 1 of the drawings which illustrates in a perspective view the most important parts of the audio and fluid apparatus systems which are located at the top of the prilling tower. Briefly, the fluid system shown in FIG. 1 includes, head tank 22, head tank line 23, header lines 24 having header line valves 24a, and spray headers 25 communicating with header lines 24 by feeder pipe 26. The audio system shown in FIG. 1 includes a signal generator 32, an amplifier 33, speaker drivers 34, sound manifold lines 35, tributary pipes 36, sound chambers 30 and sound chamber ports 31.

Reference is made to FIG. 3 to better illustrate the structure of spray header assembly 25 and the sleeve-like sound chamber 30. Header line 24 is shown in section communicating by feeder pipe 26 with spray header assembly 25 including spray plate cap 28 having a small reservoir 27 located above the orifice plate 29. Sound chamber 30, including an open ended stainless steel sleeve is attached to the lower lip 28a of spray cap 28 in such a way that it is not touching orifice plate 29. About midway down the cylindrical wall of sound chamber 30, there is an opening or port 31 for the introduction of sound waves into the sound chamber.

An embodiment of orifice plate 29 and a modification thereof, are shown in greater detail in FIGS. 4 through 9. The plan views of orifice plates shown in FIGS. 4 and 7 each have nineteen orifices; however, it was found that good results were obtained using plates having as many as fifty-three apertures. The number of apertures or orifices is not critical, however, they should be uniformly spaced so that there is a maximum distance between them to lessen the possibility of stream impingement. The cross-sectional view of orifice plate 29 shown in FIG. 5 and taken at line 5—5 in FIG. 4, illustrates a slightly dished or concave structure on the inlet side to disperse the streams. This was found to be very helpful in the formation of uniform prills. FIG. 6 shows the detailed structure of one orifice drilled through a solid 1/8" stainless steel plate also illustrated in other views in FIGS. 4 and 5. FIG. 6 shows the beveled opening whose walls define an angle of about 120°. The beveled opening 29d extends into the plate to the orifice 29e which has a diameter of approximately 0.046" and a depth of about 0.01". Satisfactory results were obtained by a 120° beveled opening in plates having nineteen openings and an 82° beveled opening in plates having fifty-three openings.

FIG. 8 is a cross-sectional view of the modification of the orifice plate 29a shown in FIG. 7. As shown in FIG. 8, this modification includes upper 0.010" shim stock 29b having 0.046" diameter holes 29f located directly above support plate 29c, having 3/16" diameter holes 29g, aligned with openings 29f in shim stock 29b. FIG. 8 also shows the dished or concave structure on the inlet side of the plates to assist in dispersing the streams to prevent their impingement and to aid in the formation of uniform prills.

In the operation, a 94% to 97% concentration range of ammonium nitrate solution flows from a concentrator, located at the bottom of the tower, to a surge tank, also so located, which has a manually controlled steam coil. From the surge tank, the ammonium nitrate melt is pumped to the head tank 22 in FIG. 1 which is located at the top of the prilling tower. The level in the head tank 22 is controlled to provide a range of 30–170" of water, preferably operated in the range of 70–90" of water. This pressure is sufficient to cause the melt solution to flow by gravity through head tank line 23, into header lines 24, feeder pipe 26 and the spray header assembly 25. Since the melt solution flows by gravity from the head tank 22, it is seen in FIG. 3 that the solution flowing into spray plate cap 28 forms a quiescent reservoir 27 undisturbed until after its passage through orifice plate 29. Satisfactory results were obtained when the orifice plate included a one piece 1/8" stainless steel plate having fifty-three—0.026" diameter holes or nineteen—0.046" diameter holes similar to that structure previously described in the discussion of FIGS. 4 through 6. Satisfactory results were also obtained when the orifice plate structure included shim stock over a supporting plate when the shim stock had either fifty-three—0.026" diameter holes or nineteen—0.046" diameter holes. The structure including shim stock is illustrated in FIGS. 7 through 9.

Below the orifice plate, the fluid exists in the form of thin streams which pass through sound chamber 30 into which sound waves are introduced through line 36 and port 31. The naturally flowing streams of liquid discharged from the orifice plate are hydroynamically stable because no disturbances are present above the plate. However, a small disturbance may cause a surface wave which can trigger a necking-down process that causes breaking up of the stream into individual droplets. In practice, random mechanical or fluid disturbances are always present. Consequently, there is always a tendency to form drops of random size and spacing after a stream of liquid passes through a constriction or orifice. To reduce or eliminate the existence of spurious vibrations, the sound chamber 30 located immediately below the orifice plate 29, was devised to introduce sonic vibrations of controlled frequency into the confined zone of said sound chamber 30 through port 31. Thus, a uniform sonic pulse is imposed upon the streams in a confined zone free of random vibrations to establish and maintain uniform nodes. It is believed that the initial node formation is reinforced throughout the enclosed chamber and a standing wave may be established.

The precision-built orifice plate 29 allows the fluid to flow from the quiescent reservoir 27 to produce streams with as little disturbance as possible. As the undisturbed streams pass through the shielded zone of the sound chamber 30, controlled vibrations having a frequency in the range of 700–1250 cycles per second can be introduced to impinge upon the disturbance-free naturally falling streams to cause the desired stream break up. Frequencies in the preferred range of 900–1150 cycles per second gave the best results. Only a small amplitude in the sound wave is required. Prill size may be effectively controlled using anywhere between 3/4 and 5 watts of output. Since the sound wave causes the break up of the streams, frequency is important. Other conditions being constant, such as melt concentration, temperature, head, etc., an increase in frequency causes a decrease in particle size.

After the undisturbed freely flowing streams pass through the sound chamber 30, where they are subjected to controlled sonic vibrations, the fluid fals through space to the bottom of the tower. What configuration the streams of fluid take during their descent through space is not fully known; however, the supposed break up of the streams into uniform droplets is depicted by numeral 37 in FIG. 3. The fluid 37, in FIG. 2, falls from the top of tower 19 for about 190 feet through countercurrent flows of cool air introduced at lower openings 20 located at the base of tower 19 along with conveyor 21. Conveyor 21 receives the solid prills and transports them into a drying train, not shown, to be cooled and dried. The nitrate is then screened for size and an anticaking and desensitizing compound is added by mixing in a rotary blender prior to bagging or loading out for bulk shipment.

The temperature of the product received on conveyor 21 at the base of tower 10 in FIG. 2, is controlled by the air flow introduced at openings 20. Fans, not shown, are used to increase the upward directed air flow, and thus increase the cooling. Too high a temperature at the base of the tower 19 results in a prill that is too soft. It splatters or breaks when it hits the bottom. Too low a temperature at the base of tower 19 is apt to result in a prill that breaks up in the pre-dryer. Other variables that may affect the uniformity of prills include, head tank pressure, the number of openings and the precise design of the orifice plate, the disturbance or lack of disturbance in the plate cap reservoir and the quality and frequency of the sound introduced into the sound chamber.

Specific examples, which are illustrative of the apparatus, may be set forth as follows:

EXAMPLE I

Using fluid apparatus of the type shown in the drawings, conventional prilling of a 96% ammonium nitrate solution, was carried out without the use of sonic vibrations. The melt flowed from the concentrator to a surge tank, equipped with a manually controlled steam coil, from which the melt was pumped to the head tank located at the top of the prilling tower. The head tank level was controlled to provide a constant head of about 155" of water pressure to cause the solution to flow by gravity through the header pipe system to the spray nozzle assemblies, each having an orifice plate consisting of fifty-three—0.026" diameter holes. As the small streams of solution left the orifice plate, they broke up into more or less random sized particles which tended to form spheroids as they fell. As they continued downward, approximately 190 feet to the base of the tower, the particles were cooled and solidified by a counter-current flow of air upward through the tower. The prills were collected on a conveyor belt at the bottom of the tower, transported to a dryer, dried and screened. This method of prilling produced a wide range of particle sizes as shown in Table I below.

*Table I.—Conventional prilling of a virgin melt solution*

| Screen Size | Plus 8 | Plus 10 | Plus 12 | Plus 14 | Minus 14 |
|---|---|---|---|---|---|
| Percent of Total | 8% | 28% | 42% | 13% | 9% |

In addition to the variation and particle size, further observation revealed an objectionable percentage of the prills were oddly shaped. This was probably caused, to a great extent, by individual particles recombining as they fell while they were fluid enough to flow together.

EXAMPLE II

A conventional prilling test, without the use of sonic vibrations, was made in a manner similar to that described in Example I, except that remelted nitrate was used. During normal plant operation, fines and off-grade product are reprocessed through a remelt system. The solution was filtered, concentrated to 83% and stored in a surge tank. The pH was adjusted and the solution further concentrated to about 96% for prilling. Prilling with remelt solution has consistently produced a poorer product than with virgin nitrate. The prills are much smaller with a considerable amount of minus 14 mesh material which must be recycled. Typical data are shown below in Table II to illustrate this difference.

*Table II.—Conventional prilling of a remelt solution*

| Screen Size | Plus 8 | Plus 10 | Plus 12 | Plus 14 | Minus 14 |
|---|---|---|---|---|---|
| Percent of Total | 1% | 12% | 36% | 25% | 26% |

In contrast to the above, remelt solution was used during several runs of the sonic prilling experiments, and there were no notable differences between the prills using remelt and those using virgin nitrate solution. The different characteristics of the remelt solution which caused excessive fines with normal prilling do not appreciably affect the control of particle size using sonic vibrations introduced in the manner set forth in this specification.

EXAMPLE III

Fluid and sonic apparatus illustrated in FIG. 1 and FIG. 2 of the drawing, were used in a continuous test of sonic prilling of ammonium nitrate melt. A four plate header, similar to that illustrated in FIG. 2, was used. An Eico Model 377 signal generator was operated on a 110 volt alternating current input and the signal generated was transmitted to an amplifier for amplifying the output to a controlled volume. This output was transmitted to a Universal 50 watt speaker driver where the amplified output was converted into air vibration or sound. The sound was conducted by pipes in the manner shown in the drawing, FIG. 1 and FIG. 2, to the sound chambers 30 through openings 31. The orifice plates were 1/8" stainless steel with nineteen—0.046" orifices similar to those illustrated in FIGS. 4 through 6 of the drawing. The data collected in this test are shown below in Table III.

*Table III.—Effect of some process variables on prill size*

| Time | Frequency, c.p.s. | Header Temp., °F. | Head, H₂O | Screen Analysis (percent) | | | | |
|---|---|---|---|---|---|---|---|---|
| | | | | +8 | +10 | +12 | +14 | −14 |
| 9:50 | 1000 | 296 | 85 | 5 | 29 | 65 | 2 | 0 |
| 10:00 | 1000 | 292 | 76 | 2 | 18 | 75 | 3 | 2 |
| 10:10 | 1050 | 290 | 74 | 4 | 20 | 73 | 2 | 2 |
| 10:15 | 1050 | 290 | 69 | 6 | 22 | 69 | 2 | 0 |
| 10:30 | 900 | 286 | 69 | 2 | 12 | 80 | 2 | 4 |
| 10:40 | 900 | 286 | 69 | 1 | 13 | 81 | 3 | 2 |
| 10:45 | 950 | 286 | 69 | 1 | 9 | 85 | 3 | 2 |
| 10:55 | 950 | 286 | 69 | 2 | 10 | 85 | 2 | 1 |
| 11:30 | 955 | 284 | 69 | 1 | 9 | 87 | 3 | 1 |
| 12:15 | 955 | 286 | 69 | 1 | 11 | 84 | 3 | 1 |
| 12:30 | 955 | 285 | 69 | 1 | 9 | 86 | 3 | 1 |
| 12:45 | 955 | 285 | 69 | 1 | 11 | 84 | 3 | 1 |
| 12:50 | 955 | 284 | 69 | 1 | 12 | 81 | 3 | 3 |
| 1:15 | 955 | 283 | 75 | 1 | 11 | 81 | 4 | 3 |
| 1:25 | 955 | 286 | 75 | 3 | 14 | 76 | 4 | 3 |
| 1:45 | 955 | 290 | 80 | 1 | 24 | 67 | 4 | 4 |
| 2:30 | 955 | ------ | 80 | 9 | 44 | 39 | 7 | 4 |

During the running of the test in which the data shown in Table III was collected, the concentration of the ammonium nitrate melt was high, particularly during the end of the run. This appeared to cause some non-uniformity of the prills formed, especially at the end of the run.

EXAMPLE IV

A test run, similar to that described in Example III, was made using an orifice plate having nineteen—0.046" orifices through a 0.01" shim stock resting on a support plate similar to the type illustrated in FIGS. 7 through 9 of the drawing. The data obtained in this test run was recorded and is shown below the Table IV.

*Table IV.—Effect of process variables on prill size*

| Frequency, c.p.s. | Header Temp., °F. | Head, H₂O | Screen Analysis (percent) | | | | |
|---|---|---|---|---|---|---|---|
| | | | +8 | +10 | +12 | +14 | −14 |
| 1000 | 287 | 90 | 1 | 3 | 89 | 4 | 3 |
| 900 | 287 | 80 | 1 | 2 | 90 | 3 | 4 |

The product resulting from the run in which the data shown in Table IV was recorded looked uniform and appeared to be in excellent condition. As noted above, the Screen Analysis was very good.

Because various possible embodiments might be made of the above invention and since various changes might be made in the embodiments above set forth, it is to be understood that all matters herein described, or shown in the accompanying drawings, are to be interpreted as illustrative and not in a limiting sense.

Having thus described the invention, there is claimed as new and desired to be secured by Letters Patent:

I claim:

1. An apparatus for prilling liquid ammonium nitrate, including a prilling tower equipped at its top with a plurality of stationary quiescent liquid reservoirs, an orifice plate forming the bottom of each of said reservoirs and through which may freely fall streams of liquid ammonium nitrate, a sound producing system, a sound chamber communicating with and depending from the lower portion of said plate, means for communicating said sound producing system and said sound chamber, means for impinging sonic vibrations upon said streams, and means for passing upwardly in countercurrent to said streams blasts of cooling gas.

2. The apparatus of claim 1 wherein said orifice plate structure includes a unitary body having a plurality of uniformly spaced apertures.

3. An apparatus for prilling liquid ammonium nitrate, comprising a prilling tower equipped at its top with a plurality of header caps, each cap being provided with an apertured bottom for supporting a quiescent body of ammonium nitrate thereabove and through the apertures of which may fall streams of ammonium nitrate, a sleeve depending from said cap and enclosing an area below said apertured bottom, a sound producing system, and conduit means for passing sonic vibrations from said system into said sleeve for impingement upon said freely falling streams.

4. The apparatus of claim 3 wherein said orifice plate structure includes a dish-shaped unitary body.

5. An apparatus for prilling liquid ammonium nitrate, comprising a prilling tower equipped at its top with a plurality of spray caps, terminated at their lower ends by orifice plates through which streams of liquid freely fall, a tank above said caps communicating with and filling said caps to maintain therein a quiescent liquid body, a sleeve depending from ecah of said caps and providing a chamber below each of said orifice plates, a sound producing system, conduits conveying sonic vibrations into each of said sleeves for impingement upon said undisturbed freely falling liquid streams, means for passing upwardly through said tower a countercurrent of cooling gas, and means for collecting solidified droplets at the base of said tower.

6. The apparatus of claim 5 wherein said orifice plate structure includes a shim-type plate having orifices, and a support plate, said shim-type plate and said support plate abutting and forming a dish-shaped means at the bottom of said reservoir and above said sound chamber.

7. An apparatus for prilling liquid ammonium nitrate, comprising a prilling tower equipped at its top with a plurality of spray caps, terminated at their lower ends by orifice plates through which streams of liquid freely fall, said orifice plates being dished on their inlet sides, a tank above said caps communicating with and filling said caps to maintain therein a quiescent liquid body, a sleeve depending from each of said caps and providing a chamber below each of said orifice plates, a sound producing system, conduits conveying sonic vibrations into each of said sleeves for impinging upon said undisturbed freely falling liquid streams, means for passing upwardly through said tower a countercurrent of cooling gas, and means for collecting solidified droplets at the base of said tower.

8. The structure of claim 7 wherein said unitary dish-shaped orifice plate is equipped with a plurality of apertures, said apertures on the inlet side having beveled walls terminating in cylindrical orifices at the outlet side.

9. The structure of claim 7 wherein said orifice plate including a shim-type plate and a lower support plate has a dish-shaped structured at the inlet side, said shim-type plate having cylindrical apertures to form small streams of fluid, and said support plate having means for supporting said shim plate without interferring with the flow of said fluid streams passing through said shim plate orifices.

10. The structure of claim 7 wherein said sonic system includes a signal generator, an amplifier, speaker drivers, and manifold lines through which sound waves are conducted to sound chambers where freely falling streams are impinged by said sound.

References Cited by the Examiner
UNITED STATES PATENTS

| | | | |
|---|---|---|---|
| 2,510,574 | 6/1950 | Greenhalgh | 264—9 |
| 2,528,407 | 10/1950 | Yeandle | 18—27 X |
| 2,898,625 | 8/1959 | Tesi Yu Chao | 18—27 |

WILLIAM J. STEPHENSON, *Primary Examiner.*